United States Patent
Riman

(10) Patent No.: US 10,315,357 B2
(45) Date of Patent: Jun. 11, 2019

(54) PRODUCTION OF MONOLITHIC BODIES FROM A POROUS MATRIX USING LOW TEMPERATURE SOLIDIFICATION IN AN ADDITIVE MANUFACTURING PROCESS

(71) Applicant: RUTGERS, THE STATE UNIVERSITY OF NEW JERSEY, New Brunswick, NJ (US)

(72) Inventor: Richard E. Riman, Belle Mead, NJ (US)

(73) Assignee: RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 180 days.

(21) Appl. No.: 15/034,298

(22) PCT Filed: Nov. 6, 2014

(86) PCT No.: PCT/US2014/064269
§ 371 (c)(1),
(2) Date: Oct. 6, 2016

(87) PCT Pub. No.: WO2015/069849
PCT Pub. Date: May 14, 2015

(65) Prior Publication Data
US 2016/0297097 A1  Oct. 13, 2016

Related U.S. Application Data

(60) Provisional application No. 61/900,774, filed on Nov. 6, 2013.

(51) Int. Cl.
*B29C 64/165* (2017.01)
*B22F 3/105* (2006.01)
(Continued)

(52) U.S. Cl.
CPC .......... *B29C 64/165* (2017.08); *B22F 3/1055* (2013.01); *B22F 3/26* (2013.01);
(Continued)

(58) Field of Classification Search
CPC ..................................................... B29C 64/165
See application file for complete search history.

(56) References Cited

U.S. PATENT DOCUMENTS

| | | | |
|---|---|---|---|
| 5,182,170 A * | 1/1993 | Marcus | B29C 64/386 264/497 |
| 5,653,925 A | 8/1997 | Batchelder | |

(Continued)

FOREIGN PATENT DOCUMENTS

| | | |
|---|---|---|
| CN | 86107123 A | 6/1987 |
| CN | 101363473 A | 2/2009 |

(Continued)

OTHER PUBLICATIONS

First Office Action and Search Report from State Intellectual Property Office (SIPO) for PRC (China) Patent Application No. 201480065497.3, dated May 24, 2017, 8 pages.

(Continued)

*Primary Examiner* — Timothy Kennedy
(74) *Attorney, Agent, or Firm* — The Marbury Law Group PLLC

(57) ABSTRACT

A method of producing a monolithic body from a porous matrix includes using low temperature solidification in an additive manufacturing process.

20 Claims, 2 Drawing Sheets

(51) Int. Cl.
  B22F 3/26      (2006.01)
  C04B 35/22     (2006.01)
  C04B 35/46     (2006.01)
  C04B 35/626    (2006.01)
  C04B 35/63     (2006.01)
  B33Y 10/00     (2015.01)
  B33Y 70/00     (2015.01)
  B28B 1/00      (2006.01)
  C04B 38/00     (2006.01)
  C22C 29/00     (2006.01)
  B33Y 80/00     (2015.01)

(52) U.S. Cl.
  CPC .............. B28B 1/001 (2013.01); B33Y 10/00 (2014.12); B33Y 70/00 (2014.12); C04B 35/22 (2013.01); C04B 35/46 (2013.01); C04B 35/6269 (2013.01); C04B 35/62625 (2013.01); C04B 35/6303 (2013.01); C04B 35/6316 (2013.01); C04B 38/0048 (2013.01); B33Y 80/00 (2014.12); C04B 2235/3213 (2013.01); C04B 2235/3454 (2013.01); C04B 2235/6021 (2013.01); C04B 2235/6026 (2013.01); C04B 2235/80 (2013.01); C22C 29/00 (2013.01); Y02P 10/295 (2015.11)

(56) References Cited

U.S. PATENT DOCUMENTS

| | | | |
|---|---|---|---|
| 6,217,816 B1* | 4/2001 | Tang | B29C 64/165 |
| | | | 264/426 |
| 6,283,997 B1 | 9/2001 | Garg et al. | |
| 6,399,018 B1 | 6/2002 | German et al. | |
| 6,939,509 B2 | 9/2005 | Kochanek | |
| 8,114,367 B2 | 2/2012 | Riman et al. | |
| 8,313,802 B2 | 11/2012 | Riman et al. | |
| 8,709,960 B2 | 4/2014 | Riman et al. | |
| 8,721,784 B2 | 5/2014 | Riman et al. | |
| 9,095,815 B2 | 8/2015 | Riman et al. | |
| 9,216,926 B2 | 12/2015 | Riman et al. | |
| 2004/0060683 A1 | 4/2004 | Sercombe et al. | |
| 2009/0142578 A1 | 6/2009 | Riman et al. | |
| 2009/0143211 A1 | 6/2009 | Riman et al. | |
| 2011/0104469 A1 | 5/2011 | Riman et al. | |
| 2011/0129407 A1 | 6/2011 | Riman et al. | |
| 2011/0129640 A1 | 6/2011 | Beall et al. | |
| 2011/0182799 A1 | 7/2011 | Riman et al. | |
| 2012/0312194 A1 | 12/2012 | Riman et al. | |
| 2013/0122267 A1 | 5/2013 | Riman et al. | |
| 2014/0093659 A1 | 4/2014 | Riman et al. | |
| 2014/0308507 A1 | 10/2014 | Riman et al. | |
| 2014/0314990 A1 | 10/2014 | Henn et al. | |
| 2014/0322083 A1 | 10/2014 | Kuppler et al. | |
| 2014/0322501 A1* | 10/2014 | Ederer | B29C 64/165 |
| | | | 264/113 |
| 2014/0342124 A1 | 11/2014 | Zambrzycki et al. | |
| 2014/0361471 A1 | 12/2014 | Hu et al. | |
| 2015/0125333 A1* | 5/2015 | Bruck | B29C 64/153 |
| | | | 425/78 |
| 2016/0303762 A1* | 10/2016 | Gunther | B29C 64/165 |

FOREIGN PATENT DOCUMENTS

| | | |
|---|---|---|
| CN | 101910086 A | 12/2010 |
| EP | 1402978 A1 | 3/2004 |
| JP | 2000144205 A | 5/2000 |
| JP | 2001162351 A | 6/2001 |
| JP | 2004508941 A | 3/2004 |
| JP | 2004115917 A | 4/2004 |
| WO | WO2008095307 A1 | 8/2008 |

OTHER PUBLICATIONS

European Patent Office Communication, Extended European Search Report pursuant to Rule 62 EPC, Supplementary European Search Report (Art. 153(7) EPC), and European Search Opinion for EP 14860481.2, dated May 29, 2017, 10 pages.
Lim, S. et al., "Developments in Construction-Scale Additive Manufacturing Processes," Automation in Construction, vol. 21, pp. 262-268, (2012).
International Search Report for PCT/US2014/064269, dated Feb. 24, 2015, 5 pages.
Written Opinion of the International Search Authority for PCT/US2014/064269, dated Feb. 25, 2015, 15 pages.
Wikipedia, the free encyclopedia, "3D Printing," https://en.wikipedia.org/wiki/3D_printing, Nov. 6, 2013, 21 pages.
E-Manufacturing Solutions, "For the Technology-Interested," Additive Manufacturing-Process, Functional Principle and Benefits—EOS, http://www.eosinfo/additive_manufacturing/for_technology_interested, Nov. 6, 2013, 2 pages.
Additive Manufacturing, http://www.renishaw.com/en/additive-manufacturing-15239, Nov. 6, 2013, 2 pages.
Hayes, T., "The Future of 3-D Printing," Optics & Photonics News, pp. 24-29, (2013).
International Preliminary Report on Patentability for PCT/US2014/064269, dated May 19, 2016.
English-Language Translation of Second Office Action, Office Communication from the State Intellectual Property Office (SIPO) for PRC (China) Patent Application No. 201480065497.3, dated Mar. 14, 2018, 2 pages.
Second Office Action, Office Communication from the State Intellectual Property Office (SIPO) for PRC (China) Patent Application No. 201480065497.3, dated Mar. 14, 2018, 3 pages.
English-language Translation of Japanese Office Action, Notification of Reasons for Refusal, from the Japan Patent Office for Japanese Patent Application No. 2016-528832, dated Aug. 7, 2018, 9 pages.
Office Action from the Japan Patent Office for Japanese Patent Application No. 2016-528832, dated Aug. 7, 2018, 4 pages.
Third Office Action from China National Intellectual Property Administration for PRC (China) Patent Application No. 201480065497.3, dated Oct. 8, 2018, 3 pages.
European Office Communication, Office Action for European Patent Application 14860481.2, dated Jan. 22, 2019, 4 pages.

* cited by examiner

PRODUCTION OF MONOLITHIC BODIES FROM A POROUS MATRIX USING LOW TEMPERATURE SOLIDIFICATION IN AN ADDITIVE MANUFACTURING PROCESS

RELATED APPLICATION

This application claims priority to U.S. Provisional Patent Application No. 61/900,774, filed on Nov. 6, 2013, the entire content of which is incorporated herein by reference.

FIELD

The present invention is generally directed to additive manufacturing processes and specifically to use of low temperature solidification in additive manufacturing.

BACKGROUND

Additive manufacturing (AM) refers to a process by which digital 3D design data is used to build up a component in layers by depositing material. Additive manufacturing includes 3D printing and other processes described in more detail below. AM is a manufacturing technique which may be distinguished from conventional methods of manufacturing which require material removal. Instead of milling a workpiece from solid block, for example, additive manufacturing builds up components layer by layer using materials which may be provided in fine powder form. A range of different metals, plastics and composite materials may be used in the various additive manufacturing processed discussed herein.

SUMMARY

An embodiment is drawn to a method of producing a monolithic body from a porous matrix including using low temperature solidification in an additive manufacturing process.

Another embodiment is drawn to a method of producing a monolithic body from a porous matrix including providing a layer of a porous matrix having interstitial spaces and comprising at least a first reactant, contacting the layer of the porous matrix with an infiltrating medium that carries at least a second reactant, allowing the infiltrating medium to infiltrate at least a portion of the interstitial spaces of the layer of the porous matrix under conditions that promote a reaction between the at least first reactant and the at least second reactant to provide at least a first product allowing the at least first product to form and fill at least a portion of the interstitial spaces of the layer of the porous matrix and repeating the above steps to produce a monolithic body.

Another embodiment is drawn to a method of producing a monolithic body from a porous matrix including providing a plurality of successive layers of a porous matrix having interstitial spaces and comprising at least a first reactant, contacting the plurality of successive layers of the porous matrix with an infiltrating medium that carries at least a second reactant, allowing the infiltrating medium to infiltrate at least a portion of the interstitial spaces of the layer of the porous matrix under conditions that promote a reaction between the at least first reactant and the at least second reactant to provide at least a first product, and allowing the at least first product to form and fill at least a portion of the interstitial spaces of the layer of the porous matrix to form the monolithic body.

Another embodiment is drawn to a method of producing a monolithic body from a porous matrix including providing a first layer of a porous matrix having interstitial spaces and comprising at least a first reactant, contacting the first layer of the porous matrix with an infiltrating medium that carries at least a second reactant, allowing the infiltrating medium to infiltrate at least a portion of the interstitial spaces of the first layer of the porous matrix under conditions that promote a reaction between the at least first reactant and the at least second reactant to provide at least a first product, allowing the at least first product to form and fill at least a portion of the interstitial spaces of the first layer of the porous matrix, providing a plurality of successive layers of the porous matrix over the first layer of the porous matrix, contacting the plurality of successive layers of the porous matrix with the infiltrating medium, allowing the infiltrating medium to infiltrate at least a portion of the interstitial spaces of the successive layers of the porous matrix under conditions that promote a reaction between the at least first reactant and the at least second reactant to provide at least a first product and allowing the at least first product to form and fill at least a portion of the interstitial spaces of the first layer of the porous matrix, thereby producing a monolithic body.

DETAILED DESCRIPTION

Figure 1:
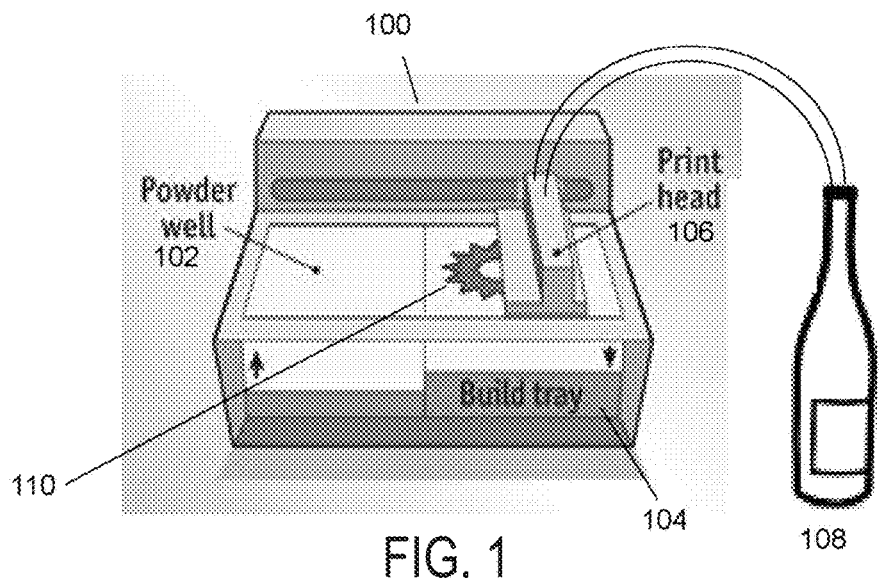
FIG. 1 is a schematic illustration of an apparatus that may be used in a method of making a monolithic body according to an embodiment.

Additive manufacturing methods such as 3D printing, stereolithography, fused-deposition modeling, electron-beam freeform fabrication, direct metal laser sintering, electron-beam melting, selective laser melting, selective heat sintering, selective laser sintering, plaster-based 3D printing, laminated-object manufacturing, digital-light processing, polyjet, and powder bed inkjet printing may be used to make monolithic bodies. These methods are described in more detail in Tables 1 and 2 below, which are reproduced from Tim Hayes, "The future of 3D printing", Optics & Photonics News, July/August 2013, page 22, and from Wikipedia 3D Printing webpage visited Nov. 6, 2013, respectively. However, several of these methods are only suitable for manufacturing with metals while others are only suitable for manufacturing with polymers. The inventors have discovered that the use of the low temperature solidification processes in additive manufacturing results in methods that are capable of manufacturing monolithic bodies of any type of material including metals, ceramics, cermets, polymers, or composites thereof.

TABLE 1

3-D Printing Technologies

| Technology | Description | Applicable Materials | Key Players |
|---|---|---|---|
| Stereolithography | Selectively cures a uniform layer of material with a UV laser | Photopolymers | 3D Systems |
| Digital light processing | Cures an inkjet-deposited material layer in a support material with a UV light | Photopolymers | Texas Instruments, Envisiontec |
| Polyjet | Cures an inkjet deposited layer with multiple materials using a UV light | Photopolymers | Objet [Stratasys] |
| Selective layer sintering | Selectively fuses material powder using a laser | Thermoplastics, metals | EOS, Morris Technologies [GE Aviation], Optomec |
| Electron beam melting | Selectively fuses material powder using an electron beam | Metals | Arcam |
| Selective heat sintering | Selectively fuses material powder using a thermal head | Thermoplastics | Blueprinter |
| Fused filament fabrication | Extrudes a material filament through a heated nozzle | Thermoplastics, food, wood and ceramic composites with a thermoplastic binder | Stratasys, Makerbot, Printrbot |
| Powder bed inkjet printing | Selectively inkjet prints a liquid binder to fix material powder into a solid | Thermoplastics, food, wood and ceramic composites with a thermoplastic binder | Zcorp [3D Systems], ExOne |
| Laminated object manufacturing | Trims sheets of material and joins with adhesive | Paper, polymer films, metal sheets | Mcor, TNO, Solido, Kira |

TABLE 2

| Type | Technologies | Materials |
|---|---|---|
| Extrusion | Fused-deposition modeling (FDM) | Thermoplastics (e.g. PLA, ABS), HDPE, eutectic metals, edible materials, Rubber (Sugru), Modelling clay, Plasticine, RTV silicone, Porcelain, Metal clay (including Precious Metal Clay) |
| Wire | Electron-Beam Freeform Fabrication (EBF$^3$) | Almost any metal alloy |
| Granular | Direct metal laser sintering (DMLS) | Almost any metal alloy |
| | Electron-beam melting (EBM) | Titanium alloys |
| | Selective laser melting (SLM) | Titanium alloys, Cobalt Chrome alloys, Stainless Steel, Aluminium |
| | Selective heat sintering (SHS) [17] | Thermoplastic powder |
| | Selective laser sintering (SLS) | Thermoplastics, metal powders, ceramic powders |
| Powder-bed and inkjet-head 3D printing | Plaster-based 3D printing (PP) | Plaster |
| Laminated | Laminated-object manufacturing (LOM) | Paper, metal foil, plastic film |
| Light polymerised | Stereolithography (SLA) | photopolymer |
| | Digital-Light Processing (DLP) | photopolymer |

In the low temperature solidification or hydrothermal liquid phase densification process, porous matrix which includes a first reactant (i.e. a material capable of undergoing a chemical reaction) is contacted with an infiltrating medium which includes a second reactant. The first and second reactants react to form a product that fills the pores in the porous matrix. In an embodiment, the porous matrix containing the first reactant is in the form of a powder. In an embodiment, the porous matrix also includes a binder, such as a polymer binder, to agglomerate the powder. Alternatively, the binder may be omitted. In another embodiment, the porous matrix includes a fluid such as water, alcohol or a combination thereof. Alternatively, other non-aqueous fluids may be used. Any suitable matrix and infiltrating materials, such as those disclosed in U.S. Pat. No. 8,313,802 attached herewith as an attachment and hereby incorporated by reference in its entirety. The term low temperature solidification is used as a synonym for the Hydrothermal Liquid Phase Sintering method described in the U.S. Pat. No. 8,313,802.

An embodiment of the method includes producing a monolithic body from a porous matrix using low temperature solidification in an additive manufacturing process. A low temperature may be any temperature less than that usually associated with the sintering of metals and ceramics. Typically, the temperatures may be less than about 500° C., such as less than about 250° C., such as room temperature to 200° C., including 80 to 180° C. The reaction pressure may be less than 100,000 psi, such as 1 to 3 atmospheres.

Another embodiment includes a method of producing a monolithic body from a porous matrix including providing a layer of a porous matrix having interstitial spaces and comprising at least a first reactant, contacting the layer of the porous matrix with an infiltrating medium that carries at least a second reactant, allowing the infiltrating medium to infiltrate at least a portion of the interstitial spaces of the layer of the porous matrix under conditions that promote a reaction between the at least first reactant and the at least second reactant to provide at least a first product, allowing the at least first product to form and fill at least a portion of the interstitial spaces of the layer of the porous matrix and repeating the above steps to produce a monolithic body.

Still another embodiment is drawn to a method of producing a monolithic body from a porous matrix including providing a plurality of successive layers of a porous matrix having interstitial spaces and comprising at least a first reactant, contacting the plurality of successive layers of the porous matrix with an infiltrating medium that carries at least a second reactant, allowing the infiltrating medium to infiltrate at least a portion of the interstitial spaces of the layer of the porous matrix under conditions that promote a reaction between the at least first reactant and the at least second reactant to provide at least a first product and allowing the at least first product to form and fill at least a portion of the interstitial spaces of the layer of the porous matrix to form the monolithic body.

Another embodiment is drawn to a method of producing a monolithic body from a porous matrix, providing a first layer of a porous matrix having interstitial spaces and comprising at least a first reactant, contacting the first layer of the porous matrix with an infiltrating medium that carries at least a second reactant, allowing the infiltrating medium to infiltrate at least a portion of the interstitial spaces of the first layer of the porous matrix under conditions that promote a reaction between the at least first reactant and the at least second reactant to provide at least a first product, allowing the at least first product to form and fill at least a portion of the interstitial spaces of the first layer of the porous matrix, providing a plurality of successive layers of the porous matrix over the first layer of the porous matrix, contacting the plurality of successive layers of the porous matrix with the infiltrating medium, allowing the infiltrating medium to infiltrate at least a portion of the interstitial spaces of the successive layers of the porous matrix under conditions that promote a reaction between the at least first reactant and the at least second reactant to provide at least a first product and allowing the at least first product to form and fill at least a portion of the interstitial spaces of the first layer of the porous matrix, thereby producing a monolithic body.

In any of the above embodiments, each layer of the of the successive layers may be contacted with the infiltrating medium prior to providing the next successive layer. Alternatively, all of the layers of the monolithic body may be first provided and then contacted with the infiltrating medium. Further, in any of the above embodiments, the entire porous matrix is completely or partially infiltrated with the infiltrating medium. In an embodiment, the porous matrix may include a binder material. In an embodiment, the infiltrating medium may react with the binder, resulting in removal of the binder from the porous matrix.

In an embodiment, allowing the at least first product to form and fill at least a portion of the interstitial spaces of the layer of the porous matrix includes heating the layer(s) of the porous matrix. The heat may be applied via conduction, induction, convection or radiation. In an embodiment, the porous matrix includes a precursor for a metal, a ceramic, a cermet, a polymer, or a composite thereof.

In an embodiment, the porous matrix is a green body. That is, the as-deposited porous matrix has not yet been reacted with the infiltrating medium to form the final product phase (e.g., the monolithic body, such as a ceramic, metal, cermet, polymer or composite thereof body).

In an embodiment, the infiltrating medium may include a gas, such as $CO_2$. In an embodiment, the porous matrix is a slurry. The slurry may include water or alcohol or a combination thereof, such as 0-20% alcohol. In an embodiment, the layer(s) of the porous matrix are provided (e.g., formed on a support) with a print head as discussed in more detail below. In an embodiment, the infiltrating medium is provided with a print head as discussed in more detail below.

In an embodiment, low temperature solidification is used to solidify a green body or to remove a binder from the green body in the additive manufacturing process. In an embodiment, the green body comprises a powder based ceramic, metal or cermet material or precursors thereof, deposited from a print head. In an embodiment, low temperature solidification includes providing a basic liquid (e.g., pH>7) to the green body and heating the green body to a temperature below 250 C to remove the binder from the green body. In another embodiment, the low temperature solidification includes providing a fluid to the green body and heating to a temperature below 250 C to solidify the green body into a monolithic solid body. In an embodiment, low temperature solidification is used to both solidify and remove the binder from the green body. In this step, the method includes providing a basic liquid to the green body and heating the green body to a temperature below 250 C to remove the binder from the green body and then solidifying the green body into a monolithic solid body during the same step as the binder removal step, or during a subsequent step with the same or with a different (e.g., neutral or acidic) fluid.

In an embodiment, the monolithic solid body has a size which is within 2% of a size of the green body size. Thus, the low temperature solidification of the green body porous matrix results in essentially no shrinkage in the layer(s) of a porous matrix. That is, the final monolithic body is essentially the same size as the original green body. For example, the shrinkage may be less than 2%, such as less than 1%. This is believed to be due to the lack of movement of the powder particles toward each other in the low temperature solidification process. In contrast, during conventional high temperature sintering, powder particles in the green body move toward each other generating shrinkage. Furthermore, materials which cannot withstand the high temperature sintering or high temperature additive manufacturing may be formed using the combination of low temperature solidification during additive manufacturing.

In another embodiment, the infiltrating fluid includes a gas and a liquid in a partially infiltrated low temperature solidification or the fluid includes a liquid in a fully infiltrated low temperature solidification. Embodiment also include products made by any if the methods discussed above.

FIG. 1 illustrates an embodiment of an apparatus 100 which may be used to practice the methods of the embodiments discussed above. In this embodiment, the apparatus 100 includes a powder well/reservoir 102 in which powder material used to make the porous matrix is stored. The apparatus 100 also includes a print tray 104 on which the monolithic body 110 will be produced and a print head 106 which may be used to deliver the infiltrating medium (e.g., the fluid) and/or the powder. The infiltrating medium may be stored in a reservoir 108 fluidly connected to the print head 106. In an embodiment, the print head 106 is configured to move in the X and Y directions while the print tray 104 is configured to move in the Z-direction. In this manner, as each successive layer of the monolithic body is deposited by the print head 106, the print tray 104 is lowered. In an alternative embodiment of the apparatus 100, the print head 106 is configured to move in the X, Y and Z directions while the print tray 104 remains stationary. Alternatively, the print head 106 may be held stationary and the print tray 106 be configured to move in the X, Y and Z directions.

EXAMPLES

Example 1: Formation of $CaCO_3$—$SiO_2$—Bonded Wollastonite ($CaSiO_3$) Bodies

Preparation of 3D Printer Ink Slurry

In the first example, 220 g of wollastonite ($CaSiO_3$) powder was dispersed in 210 mL of deionized water and milled using yttria-stabilized zirconia ball media in a rolling jar for 6 hours. The ball media was separated from the resulting suspension. Powder that stuck to the ball media was washed back into the suspension using an additional 100 mL of water. Next, 1.1 g of Darvan 811™ dispersant was added to the suspension and ammonium hydroxide ($NH_4OH$) was added dropwise to the suspension to adjust the suspension's pH to 9. The suspension was then filter-pressed into slurry with 45% solids volume fraction. Then, 1 mL of 1-octanol and 1.2 g of hydroxypropyl methylcellulose was added to the slurry, after which the slurry was shaken using a paint shaker for 30 minutes. Next, 0.5 g of a polyethylenimine (PEI) water-based solution (~50% PEI by weight) was added to the slurry, after which the slurry was shaken by paint shaker for at least 1 hour. This process yielded approximately 175 mL of ink slurry.

Printing and Carbonation of $CaSiO_3$ Bodies

Figure 2:
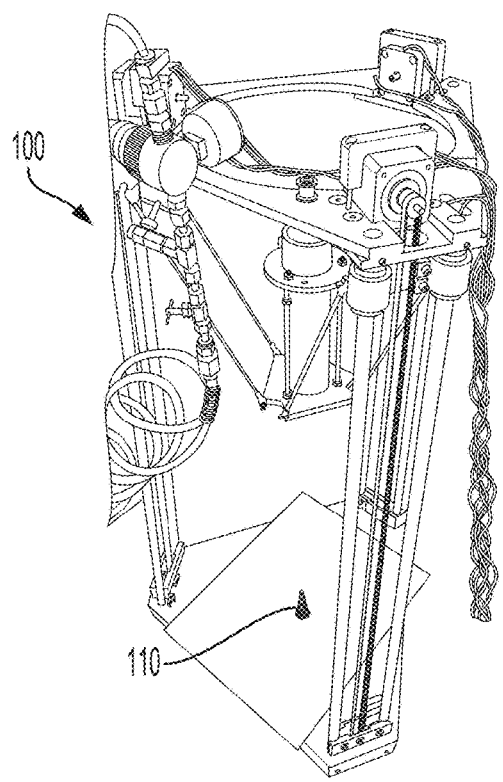
FIG. 2 is a photograph of another apparatus that may be used in a method of making a monolithic body according to an embodiment.
Figure 3:
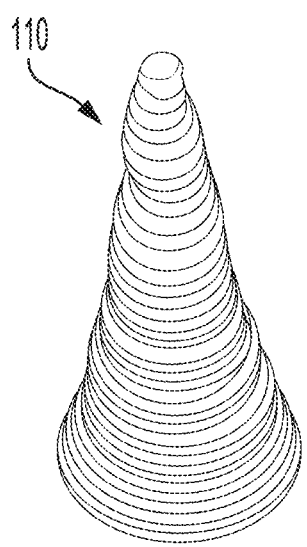
FIG. 3 is a photograph of a conical monolithic body made according to an embodiment of the method.

The $CaSiO_3$-based slurry was then loaded into a modified fused filament fabrication (FFF) delta-form 3D printer. FIG. 2 is a photograph of a FFF printer 100. The printer 100 was situated in a chamber (not shown) capable of maintaining a pressurized atmosphere with a heatable print bed. Several objects of varying shapes were printed by extruding the slurry as a continuous filament with a diameter of 0.7 mm at a rate of 1 mm/s. One example monolithic body 110, a conical $CaCO_3$/$SiO_2$—bonded $CaSiO_3$ object printed by the FFF process and solidified by a gas-assisted hydrothermal liquid phase densification (g-rHLPD) process, is shown in FIG. 3. The weight of this monolithic body 110 after printing and subsequent drying at 90° C. was 2.38 g, and its bulk volume was 1.28 $cm^3$ as measured using the Archimedes method. The printed and dried $CaSiO_3$ monolithic bodies were carbonated in the same chamber in which they were printed by the g-rHLPD process in an atmosphere of 2.36 atm $CO_2$ gas and 0.69 atm steam at 90° C. for 20 hours. The $CO_2$ was provided by an external tank while the steam was provided by heating a container of water inside the chamber. After the g-rHLPD process, the monolithic bodies were dried again. The cone weighed 3.00 g after carbonation and drying, equating to a carbonation reaction completion of ~70 mol % in the sample. The process effectively increased the relative density of the sample from ~64% to ~85%.

Example 2: Layer-By-Layer and Voxel-By-Voxel 3D Printing of $CaCO_3$—$SiO_2$—Bonded Wollastonite ($CaSiO_3$) Bodies A $CaSiO_3$ ink slurry was prepared and loaded into a 3D printer similar to the one described in Example 1 above. However, along with a heated deposition bed and filament extruder, the printer had a second nozzle for washing with deionized water and a third head containing an infrared beam emitter for direct localized heating of the spots. In one case, a cone was printed layer-by-layer. The filament extruder (print head) first deposited a 2-mm thick layer of slurry in the pattern of the bottom layer of the cone. This layer was dried at 90° C. in the print chamber for 15 minutes and then carbonated by g-rHLPD using the aforementioned conditions for another 30 minutes. The reaction yield achieved was 80 mol %, equating to a weight gain of 30% and a relative density increase from 64% to 88%. After carbonation, the next 2-mm layer was deposited and the drying/carbonation cycle was repeated. The entire process was repeated 9 times to obtain the cone through layer-by-layer printing.

In another example, a cuboid with 20 mm length, 10 mm width, and 10 mm height was printed voxel-by-voxel. First, a slurry was extruded in the pattern of a corner voxel that was 5 mm long, 5 mm wide and 2 mm thick. The drying/g-rHLPD carbonation cycle described above was performed. The reaction yield achieved was 95 mol %, equating to a weight gain of 36% and a relative density increase from 64% to 92%. The next voxel was subsequently deposited by printing the slurry. The cycle was repeated 39 times to obtain the cuboid.

Example 3: Formation of Strontium Titanate ($SrTiO_3$)—Solidified Anatase Bodies An anatase-based ($TiO_2$) slurry was prepared and printed into objects using a procedure similar to the one in Example 1. A cylindrical $TiO_2$ monolithic body with a 30 mm diameter, 2 mm thickness and a dry weight of 3.30 g was infiltrated with a solution of 14.20 g of strontium hydroxide octahydrate ($Sr(OH)_2$-$8H_2O$) in 88 mL of water inside a small pressure vessel that is a part of the build-base where the part was printed. The pressure vessel was heated to 95° C. for 144 hours to convert the $TiO_2$ in the object to $SrTiO_3$, thereby solidifying the object by a reactive hydrothermal liquid phase densification (rHLPD) process. The solidified monolithic body was then removed from the vessel for washing and drying. The sample maintained virtually the same dimensions as it had before the rHLPD treatment, but weighed 6.09 g. The weight gain equated to a reaction completion of 65.5 mol % and a relative density increase from 60% to 88%.

Example 4: Layer-By-Layer and Voxel-By-Voxel 3D Printing of Strontium Titanate ($SrTiO_3$)—Solidified Anatase Bodies An anatase-based ($TiO_2$) slurry was prepared and loaded into a 3D printer similar to the one described in Example 2. However, this printer included an additional print head with a nozzle and a housing for holding a heated reactive solution. All four print heads could move independently of each other.

The filament extruder first deposited a 2-mm thick layer of slurry in the pattern of the first layer of the printed object. The printer bed was heated to quickly dry the printed material at 90° C. for 15 minutes. The second nozzle then deposited 15 mL of a 1 molar solution of $Sr(OH)_2\cdot 8H_2O$ in water onto the printed layer at a rate of 500 µL/min. The solution infiltrated the porous matrix of the deposited material. Both the solution in the housing and the printer bed (print tray) were heated to 95° C. to allow labile reaction of the solution with the deposited layer so as to solidify it. This solidification step was performed for 30 minutes. The reaction completion was 70 mol % and the relative density increased from 60% to 91%. Next, the densified layer was washed free of unreacted strontium and base ions by the DI water nozzle and then dried at 90° C. for 15 minutes. Following this, a 2-mm layer of the object was then deposited following the above process. In another example, an additional cycle of 1 molar solution of $Sr(OH)_2\cdot 8H_2O$ in water was used to further densify the layers prior to the next layer deposition. The entire process was repeated 59 times to produce a cone-shaped monolithic body.

In yet another example, a cuboid with 20 mm length, 10 mm width, and 10 mm height was printed voxel-by-voxel in a process similar to the one described in Example 2. The slurry was extruded in the pattern of a 5 mm length×5 mm wide×2 mm thick corner voxel. The printer bed was heated to dry the printed material for 15 minutes, after which the second nozzle deposited 3 mL of the aforementioned $Sr(OH)_2\cdot 8H_2O$ at a rate of 200 µL/min. The deposited material was allowed to react for 15 minutes with the solution under the conditions described above in this example, after which it was washed and dried for another 15 minutes. The reaction completion was 83 mol % and the relative density increased from 60% to 96%. The next voxel was extruded and the cycle repeated 39 times to produce the full solidified cuboid.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of producing a monolithic body from a porous matrix comprising:
   printing a slurry comprising a first reactant in a pattern followed by drying the slurry to form a layer of a porous matrix having interstitial spaces;
   infiltrating the interstitial spaces of the porous matrix with an infiltrating medium that comprises a second reactant;
   heating the infiltrated porous matrix at temperature below 250° C., such that the first and second reactants form a first product in the interstitial spaces and densify the layer; and
   repeating the above steps to produce a monolithic body, wherein the heating changes the size of the layer by less than 2%.

2. A method of producing a monolithic body from a porous matrix comprising:
   printing a slurry comprising a first reactant in a pattern followed by drying the slurry to form successive layers of a green body comprising a porous matrix having interstitial spaces;
   infiltrating the interstitial spaces of the porous matrix with an infiltrating medium that comprises a second reactant; and
   heating the infiltrated porous matrix at temperature below 250° C., such that the first and second reactants form a first product in the interstitial spaces and densify the green body to form a monolithic solid body, wherein the size of the monolithic solid body is within 2% of the size of the green body.

3. The method of claim 2, wherein each layer of the plurality of successive layers is contacted with the infiltrating medium prior to providing the next successive layer.

4. The method of claim 2, wherein all of the layers of the plurality of successive layers are first provided and then the plurality of successive layers are contacted with the infiltrating medium.

5. A method of producing a monolithic body from a porous matrix comprising:
   printing a slurry comprising a first reactant in a pattern followed by drying the slurry to form a first layer of a porous matrix having interstitial spaces and comprising at least a first reactant;
   infiltrating the interstitial spaces of the porous matrix with an infiltrating medium that comprises a second reactant;
   heating the infiltrated first layer at temperature below 250° C., such that the first and second reactants form a first product in the interstitial spaces and densify the first layer;
   printing, the slurry in a pattern followed by drying the slurry to form at least one second layer of the porous matrix over the first layer of the porous matrix;
   infiltrating the interstitial spaces of the at least one second layer with the infiltrating medium;
   heating the at least one second layer at temperature below 250° C., such that the first and second reactants form a first product in the interstitial spaces and density the at least one second layer,
   wherein the heating changes the size of the first and second layers by less than 2%.

6. The method of claim 1, wherein the entire porous matrix is completely infiltrated with the infiltrating medium.

7. The method of claim 1, wherein the porous matrix comprises a binder material.

8. The method of claim 7, wherein the infiltrating medium reacts with the binder, resulting in removal of the binder from the porous matrix.

9. The method of claim 1, wherein the method comprises an additive manufacturing process.

10. The method of claim 1, wherein the porous matrix comprises a precursor for a metal, a ceramic, a cermet, a polymer, or a composite thereof.

11. The method of claim 1, wherein: the printing comprises printing the slurry in the shape of a layer of the monolithic body.

12. The method of claim 1, wherein the infiltrating medium comprises a gas.

13. The method of claim 1, wherein the layers of the porous matrix are printed with a print head.

14. The method of claim 1, wherein the infiltrating medium is provided with a print head.

15. The method of claim 13, wherein the slurry is printed voxel by voxel in the pattern by the print head.

16. The method of claim 1, wherein the porous matrix comprises a precursor for a ceramic and does not contain a polymeric binder.

17. The method of claim 2, wherein the slurry is printed voxel by voxel in the pattern by a print head.

18. The method of claim 2, wherein the porous matrix comprises a precursor for a ceramic and does not contain a polymeric binder.

19. The method of claim 5, wherein the slurry is printed voxel by voxel in the pattern by a print head.

20. The method of claim 5, wherein the porous matrix comprises a precursor for a ceramic and does not contain a polymeric binder.

* * * * *